July 27, 1965 W. D. SNELLING 3,196,487
MELT CUTTER APPARATUS
Filed July 18, 1963 2 Sheets-Sheet 1

INVENTOR
WILLIAM DALE SNELLING

BY *Earl L. Lynch Jr.*
ATTORNEY

July 27, 1965　　　W. D. SNELLING　　　3,196,487
MELT CUTTER APPARATUS
Filed July 18, 1963　　　　　　　　　2 Sheets-Sheet 2
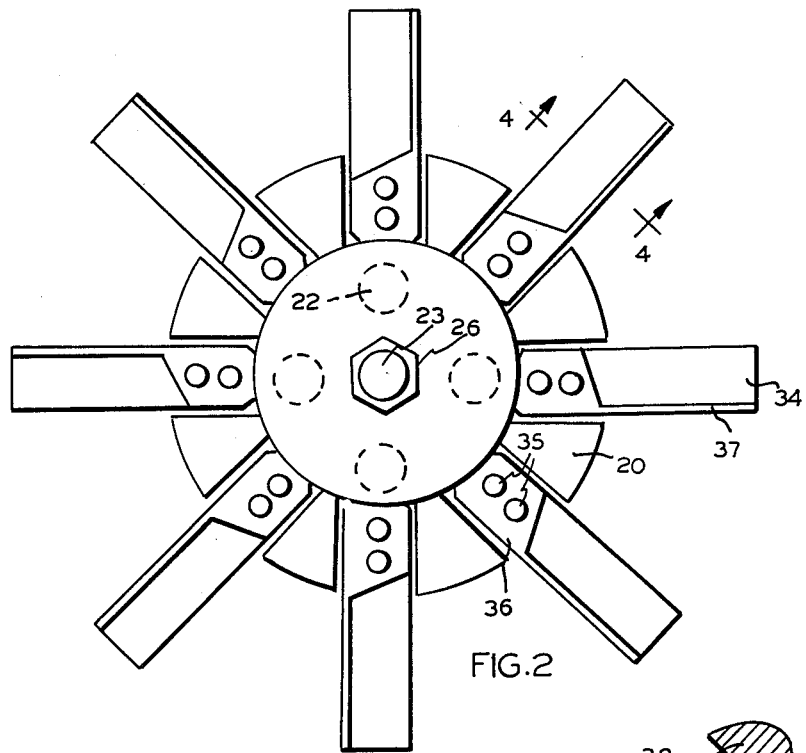
FIG. 2
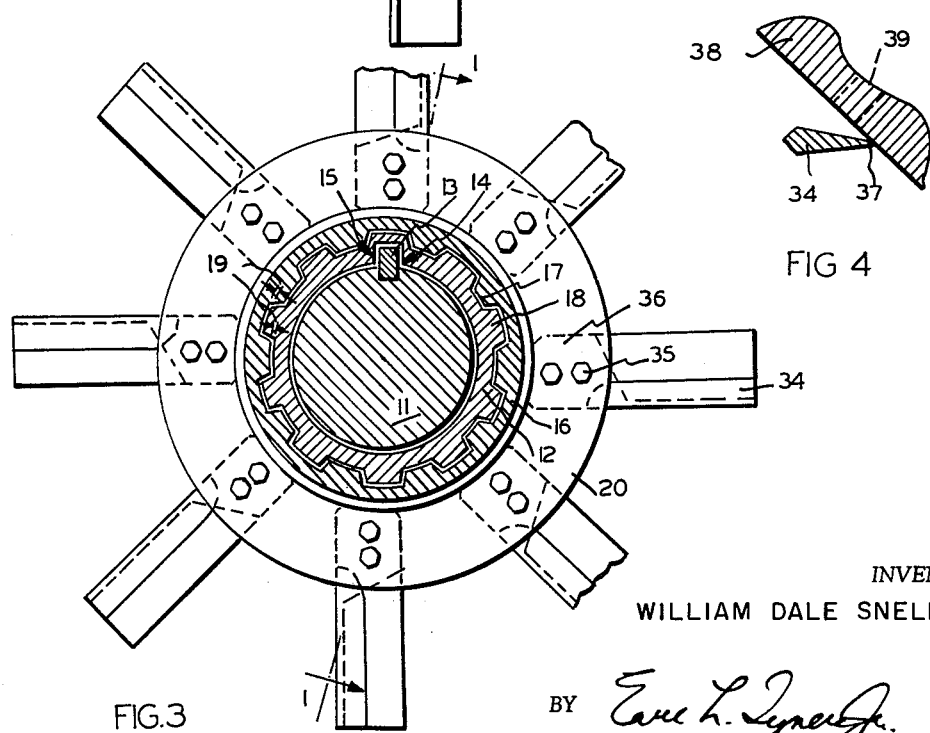
FIG. 3
FIG 4
INVENTOR
WILLIAM DALE SNELLING
BY
ATTORNEY United States Patent Office 3,196,487
Patented July 27, 1965

3,196,487
MELT CUTTER APPARATUS
William Dale Snelling, Port Neches, Tex., assignor to E. I. du Pont de Nemours and Company, Wilmington, Del., a corporation of Delaware
Filed July 18, 1963, Ser. No. 296,042
7 Claims. (Cl. 18—12)

This invention relates generally to the field of forming pellets, or granules, from extruded strands of a plastic material.

More specifically, this invention involves an improved rotary cutter apparatus cooperating with a die structure defining one or more melt extrusion orifices and preferably adapted for operation while submerged in a liquid medium to cool the material which usually is extruded through the orifices in molten form.

It has been found, in working with conventional melt cutter devices, that the maintenance of the cutter element-to-die clearance is very important and critical for proper cutting action. If this clearance becomes too large, poor and incomplete cutting action results; conversely, if the clearance is reduced to zero, severe knife and die wear occurs. Two factors which affect the cutter element-to-die clearance are thermal expansion and wear of associated parts. Good alignment between the cutter device and the cooperating die structure is also important in maintaining the desired clearance.

Therefore, an object of this invention is the provision of an improved melt cutter apparatus for producing thermoplastic pellets or granules of uniform size and shape. A particular object is the provision of a liquid phase melt cutter apparatus which will function effectively for long periods of time with a minimum of knife and die wear.

The above and other objects are accomplished by the novel features of the present invention which will become apparent from the following description, having reference to the annexed drawings wherein:

FIGURE 2 is an end view of the melt cutter taken on the line 2—2 of FIGURE 1.

FIGURE 3 is a transverse cross-sectional view taken on the line 3—3 of FIGURE 1.

FIGURE 4 is a transverse cross-sectional view taken on the line 4—4 of FIGURE 2.

Like reference numerals indicate like parts throughout the several views of the drawings.

Figure 1:
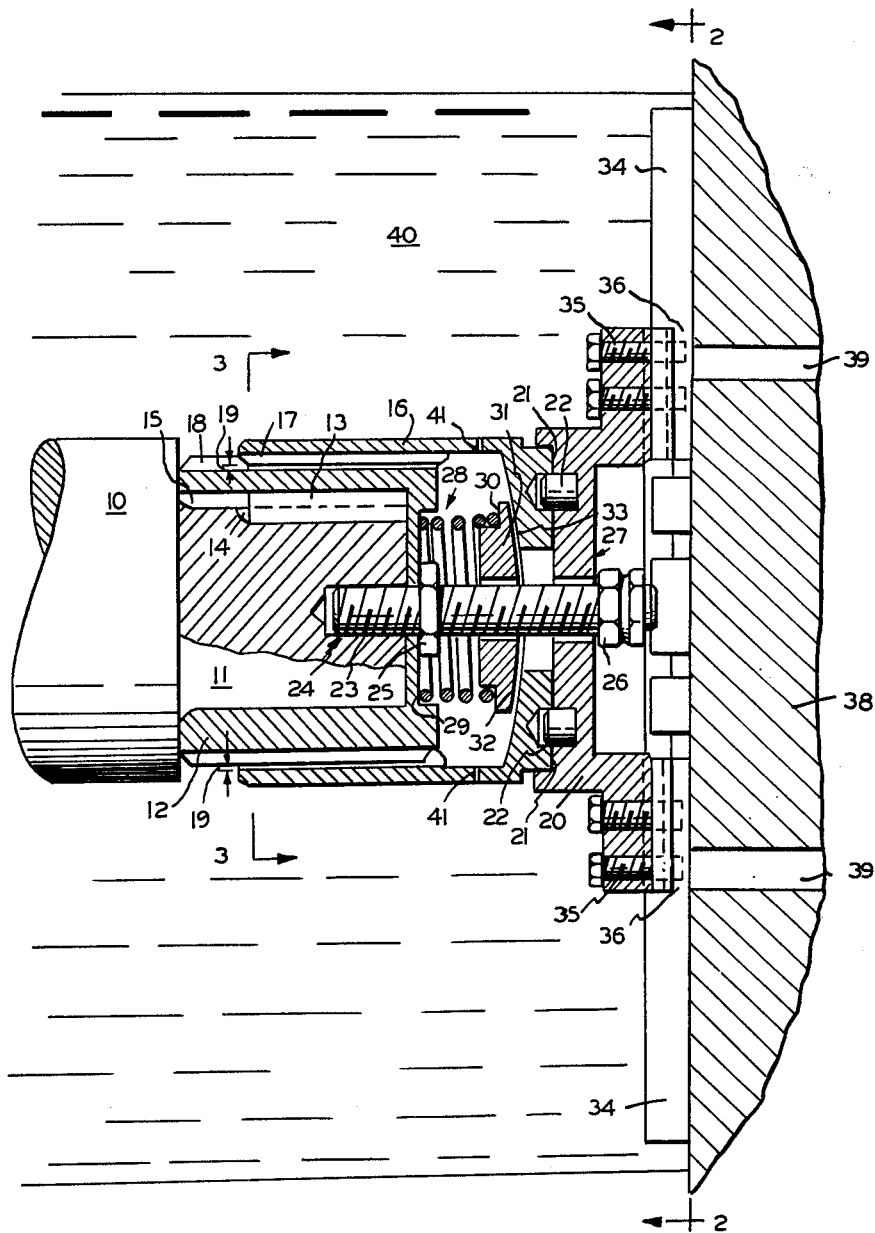
FIGURE 1 is a side elevation, partly in section (taken on the line 1—1 in FIGURE 3), of the melt cutter apparatus, with certain parts broken away to more clearly show cooperation of the members of the apparatus.

The process for extruding and cutting a molten thermoplastic resin into the form of discrete pellets or granules, accomplished with the aid of the improved melt cutter apparatus of the present invention, comprises continuous extrusion of strands of the molten thermoplastic resin through one or more orifices, formed in a planar die face, directly into a cooling liquid, and cutting the extruded strand(s) within the cooling liquid into pellets or granules as the latter are undergoing solidification.

The objects of the present invention are accomplished by the use of an improved rotary melt cutter apparatus for producing pellets from a strand or strands of a partly molten thermoplastic resin in cooperation with an extrusion die, said extrusion die having a planar die surface intersected by one or more extrusion orifices, said improved rotary melt cutter apparatus adapted to be driven rotationally by a rotating shaft structure, means for connecting said rotating shaft structure to a rotating knife holder assembly, said rotating knife holder assembly mounted and supported in cooperative association with said planar die surface and said orifices of said extrusion die such that the plane of rotation of said rotating knife holder assembly is maintained adjacent and in alignment parallel to said planar die surface and said orifices so that no more than a predetermined limited amount of wear occurs, means for urging said rotating knife holder assembly axially toward said planar die surface and said orifices, and limiting stop means, said limiting stop means mounted on said rotating shaft structure and acting to limit the movement of said rotating knife holder assembly toward said planar die surface.

Referring now to the drawings, there is shown therein a portion of the rotating drive shaft 10 which is provided with a reduced portion 11. The rotational movement of the reduced portion of the drive shaft 11 is transmitted to an inner cap member 12 by means of a connecting key 13, which is positioned in a keyway formed by axially aligned, corresponding slots 14 and 15 in the reduced portion of the drive shaft 11 and in the inner cap member 12, respectively. One alternate structure is to make members 10, 11, and 12 into one integral piece thereby eliminating key 13 and slots 14 and 15. The rotational movement of the inner cap member 12 is in turn transmitted to an outer sleeve member 16 by means of a relatively loose fitting of a plurality of circumferentially spaced and axially extended splines 17 located on the interior periphery of the outer sleeve member 16 with a corresponding plurality of circumferentially spaced and axially extended splines 18 located on the exterior periphery of the inner cap member 12. The looseness of this fit is indicated by radial clearance 19 between the outermost surfaces of the respective splines of one member and the corresponding innermost surfaces of the other member. This splined connection between the members allows axial and angular movement of the outer sleeve member 16 and the knife holder assembly 20. The knife holder assembly 20 is secured to the outer sleeve member 16 by frictional engagement at 21 and by dowel pins 22, thus allowing transmission of the rotational movement from the outer sleeve member 16 as well as the above-mentioned axial and angular movement to the knife holder assembly 20. An alternative structure is to make member 16 and assembly 20 from one integral piece thereby eliminating dowel pins 22. A stud bolt 23, which is threadably received into a recess 24 formed in the reduced part of the drive shaft 11, is provided with two hexagonal nuts 25 and 26. A jam nut 25 holds the inner cap member 12 tightly against the reduced portion of the drive shaft 11. An outer stop nut 26 is positioned against the outer face 27 of the knife holder assembly 18 and can be adjustably positioned to pre-load the helical spring 28. The helical spring 28 is positioned between the flat face of the inner cap member 29 and that of the washer 30. The washer 31 is provided with a convex spherical face 32 which engages with the concave inner face 33 of the outer sleeve member 16. The knife holder assembly 20 which is held firmly against the stop nut 26 by virtue of spring tension transmitted by the washer 30 and the outer sleeve member 16, is mounted around the stud bolt 23 and possesses a number of circumferentially spaced and radially extending knife elements 34. The knife elements 34 are secured in place by any suitable means, e.g. by threaded bolts 35, in the ends 36 of the knife holder assembly 20. The edges 37 of the knife elements 34 are positioned adjacent to the die face 38 and the extrusion orifices 39 and rotate in a plane parallel to the planar die face 38.

FIGURE 1 shows the entire melt cutter assembly submerged in a cooling liquid 40 with ports 41 provided in the outer sleeve member for ready flow-through of the cooling liquid 40.

Before operating the apparatus of the present invention, the helical spring is pre-loaded by tightening the stop nut 26. The drive shaft is then moved toward the die face until knife element-to-die face contact occurs. Further movement of the drive shaft moves the outer face of the knife holder assembly away from the stop nut thus causing the edges of the knife elements to be held against the die face by the joint action of the spring force and, when a cooling liquid is used, the spring force may be complemented by the hydraulic force generated by the rotational movement of knife elements 34, set at an angle to the direction of travel as the elements move through the cooling liquid 40. A predetermined amount of knife and die wear is thereby provided before the knife holder assembly again engages the stop nut which prevents further knife movement toward the die.

As a melt cutter apparatus is operated, knife element-to-die face contact and wear of the knives and die face occurs until the outer face of the knife holder assembly comes in contact with the stop nut at which time the die face and knife elements have worn into conformity and the knife element-to-die face clearance is essentially zero.

As has been mentioned, the knife element-to-die face clearance is critical for proper cutting action. In general, the closer the clearance, the more complete and uniform the cut obtained. Thus, the attainment of a slight but fixed knife blade-to-die face clearance and its maintenance over long periods of operation insures the production of pellets or granules of uniform dimension. The fact that the cut continues to be good after the wear allowance has gone means that the problem of frequently setting and controlling the knife element-to-die face clearance is eliminated. Furthermore, knife and die wear is reduced to permissable limits since severe knife element-to-die face contact is virtually eliminated.

The angular movement of the knife holder assembly, relative to the axis of the drive shaft, permitted by the radial clearance between the splines of the outer sleeve member and the inner cap member, allows the knife holder assembly, and thus the knife elements themselves, to be self-aligning to a degree. This minimizes the need for precise alignment of the die face perpendicular to the drive shaft and will allow for a certain amount of mis-alignment of the drive shaft itself. In any case, the plane of rotation of the knife elements will remain parallel to the surface of the die face, further ensuring the uniformity of the cutting action and wear of the parts.

The cooling liquid, when used with the melt cutter apparatus of the present invention is kept at a temperature below its boiling point and below that temperature at which the cut granules or pellets stick together. Furthermore, the liquid should be non-reacting with the thermoplastic and of any convenient viscosity. The pellets are then removed by any suitable means and dried. If desired, air or other gases may be used in place of a liquid as the cooling medium surrounding the melt cutter assembly.

Other modifications within the spirit of this invention will become apparent from the foregoing detailed description, and the invention is to be limited only to the extent indicated in the following patent claims.

I claim:

1. An improved rotary melt cutter apparatus for producing pellets from a strand or strands of a partly molten thermoplastic resin in cooperation with an extrusion die, said extrusion die having a planar die surface intersected by one or more extrusion orifices, said improved rotary melt cutter apparatus adapted to be driven rotationally by a rotating shaft structure, said apparatus comprising a rotating knife assembly and connecting means cooperating with said assembly and such associated rotating shaft structure for rotationally connecting such rotating shaft structure to said rotating knife assembly, said apparatus further comprising a biasing means urging said rotating knife assembly axially toward said planar die surface and said orifices, said apparatus further comprising adjustable limiting stop means, said limiting stop means mounted on said rotating shaft structure and cooperating with said rotating knife assembly to oppose and limit the movement of said rotating knife assembly toward said planar die surface, said rotating knife assembly cooperating with said biasing means and said adjustable stop means, and supported by said connecting means in position relative to said planar die surface and said orifices of said extrusion die such that said rotating knife assembly is maintained adjacent, in alignment parallel to, and in operative cutting relationship with said planar die surface and said orifices so that no more than a predetermined, limited amount of wear of the knife assembly and die surface occurs during operation of the apparatus.

2. The improved rotary melt cutter apparatus of claim 1, wherein the rotating shaft structure comprises a rotating drive shaft having an axis of rotation substantially perpendicular to the planar die surface and extrusion orifices.

3. The improved rotary melt cutter apparatus of claim 1, wherein the means for connecting the rotating shaft structure to the rotating knife assembly transmits the rotational movement of said rotating shaft structure to said rotating knife assembly and is comprised of an inner cap member, said inner cap member secured to said rotating shaft structure, and loosely connected to an outer sleeve member, said outer sleeve member rigidly fixed to said rotating knife assembly.

4. The improved rotary melt cutter apparatus of claim 3, wherein the inner cap member is loosely connected to the outer sleeve member by means of a plurality of circumferentially spaced and axially extended splines, said splines located on the outer and inner peripheral surfaces, respectively, of said inner cap member and said outer sleeve member, and spaced sufficiently apart to allow said outer sleeve member a degree of axial and angular movement, said outer sleeve member rigidly fixed to the rotating knife assembly, said degree of axial and angular movement transmitted to said rotating knife assembly.

5. The improved rotary melt cutter apparatus of claim 1, wherein the means for urging the rotating knife assembly toward the planar die surface and extrusion orifices comprises resilient means.

6. The improved rotary melt cutter apparatus of claim 5, wherein the resilient means is comprised of a spring acting between the rotating shaft structure and the rotating knife assembly.

7. The improved rotary melt cutter apparatus of claim 1, wherein the limiting stop means mounted on the rotating shaft structure comprises a stud bolt, positioned to pass through a central opening in the rotary knife assembly and the parts comprising the connecting and urging means, said stud bolt fixed to said rotating shaft structure and possessing an adjustably positioned stop nut, said stop nut acting to limit movement of said rotating knife assembly toward the planar die face and extrusion orifices.

References Cited by the Examiner
UNITED STATES PATENTS

| | | | |
|---|---|---|---|
| 1,822,309 | 9/31 | Nunez | 107—14.6 |
| 2,065,141 | 12/36 | Menkin | 18—12 |
| 2,144,054 | 1/39 | Hall | 18—12 |
| 2,144,055 | 1/39 | Hall | 18—12 |
| 2,594,894 | 4/52 | Fehrenbach | 18—12 |
| 3,029,466 | 4/62 | Guill | 18—12 |

MICHAEL V. BRINDISI, *Primary Examiner.*